(12) United States Patent
Bletscher et al.

(10) Patent No.: US 12,533,836 B2
(45) Date of Patent: Jan. 27, 2026

(54) INJECTION MOLDING UNIT FOR AN INJECTION MOLDING MACHINE FOR PROCESSING PLASTICS

(71) Applicant: ARBURG GMBH + CO KG, Loßburg (DE)

(72) Inventors: Rainer Bletscher, Baiersbronn (DE); Eberhard Duffner, Starzach (DE)

(73) Assignee: ARBURG GMBH + CO KG, Lossburg (DE)

( * ) Notice: Subject to any disclaimer, the term of this patent is extended or adjusted under 35 U.S.C. 154(b) by 445 days.

(21) Appl. No.: 17/923,289

(22) PCT Filed: May 5, 2021

(86) PCT No.: PCT/EP2021/061898
§ 371 (c)(1),
(2) Date: Nov. 4, 2022

(87) PCT Pub. No.: WO2021/224344
PCT Pub. Date: Nov. 11, 2021

(65) Prior Publication Data
US 2023/0226730 A1    Jul. 20, 2023

(30) Foreign Application Priority Data
May 8, 2020   (DE) .................... 10 2020 112 590.9

(51) Int. Cl.
*B29C 45/17*   (2006.01)
(52) U.S. Cl.
CPC .................. *B29C 45/176* (2013.01)
(58) Field of Classification Search
None
See application file for complete search history.

(56) References Cited

U.S. PATENT DOCUMENTS 4,846,652 A * 7/1989 Hehl .................. B29C 45/1775
425/574

FOREIGN PATENT DOCUMENTS

DE    3735701 C1    4/1989
DE    4021857 A1    2/1991
(Continued)

OTHER PUBLICATIONS

International Search Report PCT/EP2021/061898 filed May 6, 2021; Mail date Jul. 15, 2021.

*Primary Examiner* — Armand Melendez
(74) *Attorney, Agent, or Firm* — CANTOR COLBURN LLP

(57) ABSTRACT

An injection molding unit for an injection molding machine for processing plastic including a carrier block and an exchangeable plasticizing cylinder which is removably receivable in a receiving bore, where a locking device is provided for locking and unlocking the plasticizer unit together with the carrier block by relative movement of bevel surfaces extending crosswise to the injection axis together with operatively connected locking elements which are guided on bearing surfaces, where a bearing nut is provided on the outer surface of the plasticizer cylinder, the surface of which bearing nut pointing in the direction of the carrier block forms at least one of the bearing surfaces, and a plurality of locking elements are provided which either have bevel surfaces pointing toward each other, independently of the carrier block and plasticizer cylinder, which slide on each other during a locking movement and during an unlocking movement, or have, on the side spaced apart from the bearing surface of the bearing nut, mutually inclined bevel surfaces which slide synchronously on bevel surfaces of the carrier block during a locking movement and during an unlocking movement.

5 Claims, 10 Drawing Sheets

(56) References Cited

FOREIGN PATENT DOCUMENTS

| | | |
|---|---|---|
| DE | 4142927 C1 | 7/1993 |
| EP | 0314942 A1 | 5/1989 |
| EP | 0316561 A1 | 5/1989 |
| EP | 0548704 A1 | 6/1993 |
| FR | 2450156 A1 | 1/1980 |
| JP | 58187323 A | 11/1983 |

* cited by examiner

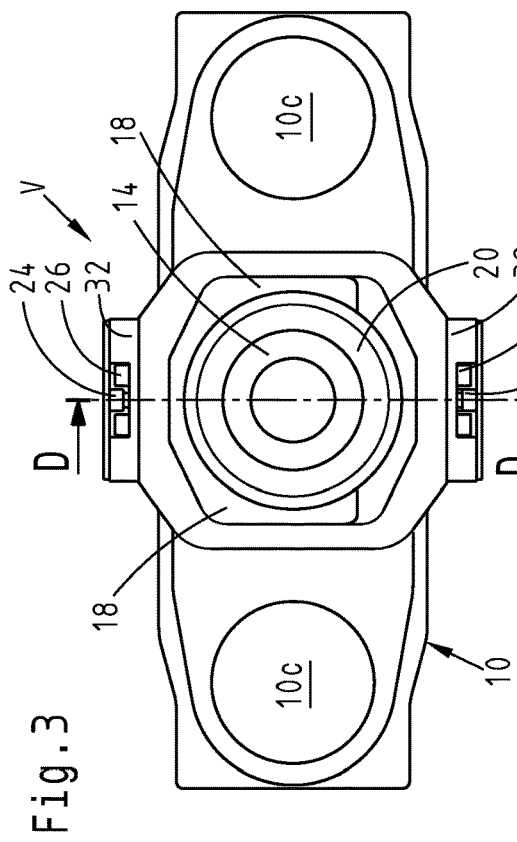
Fig.3
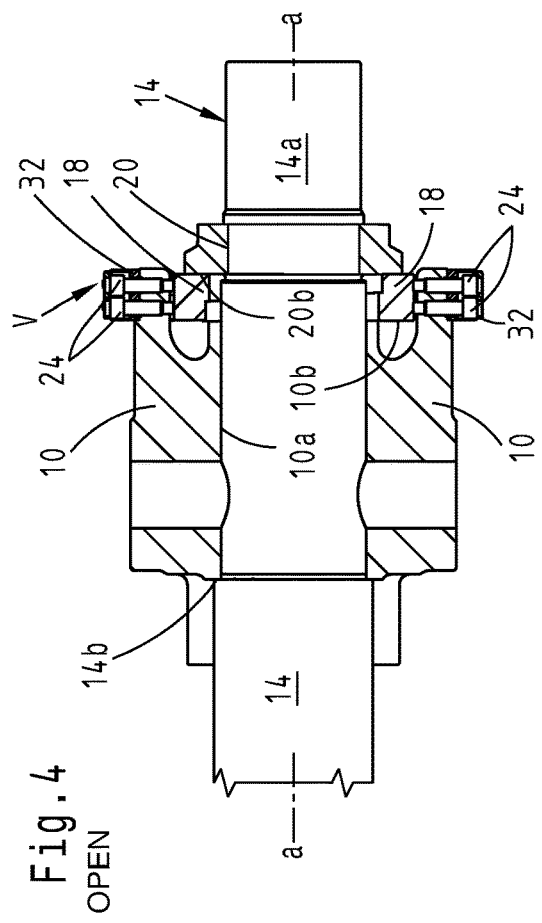
Fig.4 OPEN
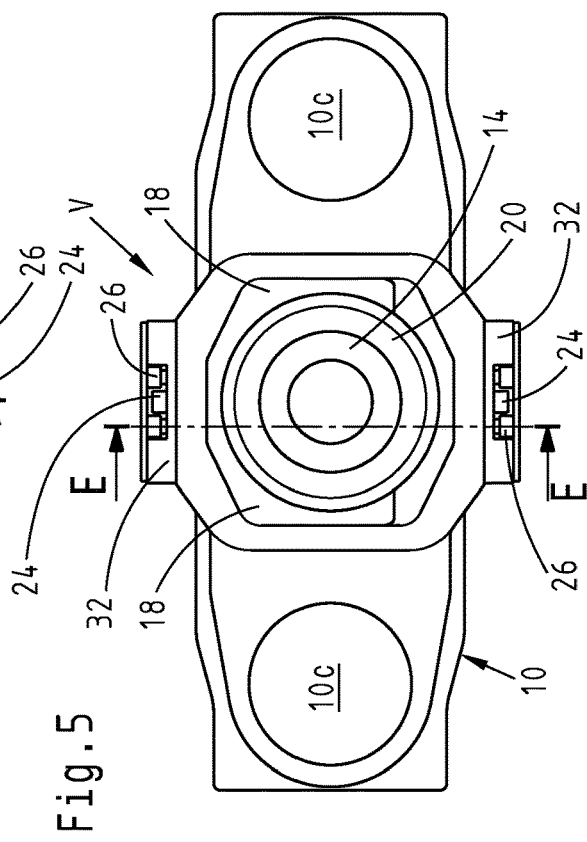
Fig.5
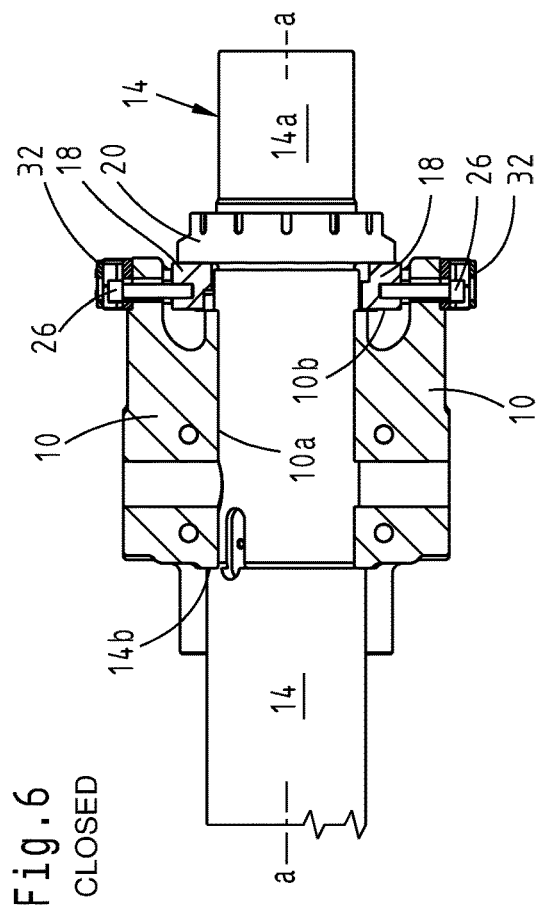
Fig.6 CLOSED

INJECTION MOLDING UNIT FOR AN INJECTION MOLDING MACHINE FOR PROCESSING PLASTICS

CROSS REFERENCE TO RELATED APPLICATIONS

The present application relates to and claims the priority of German patent application 10 2020 112 590.9 filed on May 8, 2020, the disclosure of which is hereby explicitly incorporated by reference into the subject matter of the present application.

TECHNICAL FIELD

The invention relates to an injection moulding unit for an injection moulding machine for processing plastics and other plasticisable substances.

BACKGROUND

Injection moulding machines for processing plastics and other plasticisable substances regularly have a mould closing unit for receiving injection moulds, into which plasticised material is injected by means of a plasticiser unit received in an injection moulding unit. The injection moulding unit is for this purpose supported on a machine base by means of a carrier block, in which a plasticiser cylinder can be received replaceably. In the plasticiser cylinder itself there is provided a feeding means, such as a feeding screw, which is displaceable along an injection axis and by means of which the material to be plasticised is plasticised and injected as the result of an injection operation.

In order to receive the plasticiser cylinder replaceably and releasably in the receiving bore of the carrier block, a locking device is provided, which on the one hand is intended to hold reliably the plasticiser cylinder in the receiving bore, and on the other hand must transfer reliably the forces occurring during the injection moulding process from the plasticiser cylinder to the carrier block.

EP 0 200 962 B1 discloses such an injection moulding unit, in which a plasticiser cylinder is held by means of bolts. During the locking process, bevel surfaces of bolts guided in guide tracks engage with the rear, bevelled end face of the plasticiser cylinder.

EP 0 548 704 A1 discloses a plastics injection moulding unit with a locking device for the plasticiser cylinder, in which the locking is achieved by means of a threaded connection by means of a motorised drive. The plasticiser cylinder has a locking thread, which is arranged symmetrically to the injection axis on the plasticiser cylinder. The nut connected thereto has a toothing in which a spindle drive meshes for actuation.

JP S58-187 323 A describes an apparatus for locking a plasticiser cylinder on an injection moulding machine, in which wedges are inserted into correspondingly shaped grooves of the plasticiser cylinder by means of cylinder units. The plasticiser cylinder is released from the injection moulding unit by removing the wedges from the grooves.

DE 40 21 857 A1 describes an injection moulding machine with an injection moulding unit and a replaceable plasticiser cylinder. The plasticiser cylinder is secured to the injection moulding machine or can be coupled thereto by means of mechanically or hydraulically actuatable clamping apparatuses. The plasticiser cylinder is provided with an adapter plate, which is acted on by the apparatuses of the injection moulding machine. The locking is achieved by means of wedge-shaped clamping elements.

DE 37 35 701 C1 describes an automated locking device for locking a plasticiser cylinder to the carrier block of an injection moulding unit. Slides are inserted into U-shaped recesses of the plasticiser cylinder by means of a hydraulically actuatable mechanism and the plasticiser cylinder is thus clamped to the carrier block.

BRIEF SUMMARY

Proceeding from this prior art, the object of the present invention is to develop an injection moulding unit of this kind such that even relatively large forces can be transferred reliably between the plasticiser cylinder and the carrier block and, simultaneously, a low-wear locking is created in respect of the plasticiser cylinder.

The injection moulding unit comprises a carrier block with a central receiving bore, in which a plasticiser cylinder of a plasticiser unit can be received releasably. A locking device is provided for alternately locking the plasticiser unit on the carrier block and unlocking the plasticiser unit from the carrier block by relative movement of bevel surfaces running transversely to the injection axis on operatively connected locking elements. A bearing nut is provided on the outer surface of the plasticiser cylinder, the surface of said bearing nut oriented in the direction of the carrier block forming at least one bearing surface for the locking elements.

In principle, a plurality of locking elements are provided, the locking elements in one embodiment having bevel surfaces which are oriented toward each other, independently of the carrier block and plasticiser cylinder, and which slide on each other during the locking movement and during the unlocking movement. This has the advantage that the bevel surfaces exposed to greater wear are not provided on the carrier block and the plasticiser unit, but on the more easily replaceable locking elements, since the bearing surfaces relative to the bearing nut and thus the plasticiser unit and the carrier block do not come into contact with said bevel surfaces. At the same time, a force introduction is achieved symmetrically to the injection axis, in particular of the forces created during the injection moulding process, such as the injection forces, which is advantageous on account of the higher forces in particular in large machines and also reduces the wear on the plasticiser cylinder as well as the introduction of forces into the bearing nut.

Alternatively, the plurality of locking elements are arranged on the bearing nut such that they have, on the side spaced from the bearing surface of the bearing nut, oppositely inclined bevel surfaces. The force is thus introduced in the direction of the bearing nut associated with the plasticiser cylinder. At the same time, a force introduction symmetrical to the injection axis is ensured, so that the wear in particular at the plasticiser cylinder as a result of the locking and unlocking movement of the plasticiser cylinder at the carrier block and as a result of the cyclical micro-movements during pressure build-up and pressure reduction during the injection cycle is significantly reduced.

The bearing surfaces of bearing block and/or bearing nut are preferably arranged at a right angle to the injection axis. Since these bearing surfaces are at the same time the surfaces along which the locking elements slide, these bearing surfaces are not loaded by transverse forces in comparison to the locking bevel surfaces, since merely a fully normal force acts on these surfaces. By contrast, at the bevel surfaces a transverse force can also be created in the surface and contributes to the wear.

In a preferred embodiment the locking elements are formed by at least two wedges guided diametrically to the injection axis between the carrier block and bearing nut. This has the advantage that the locking can be ensured easily and reliably with few elements, without the need for a complex rearrangement of components or any vulnerable mechanical connection points.

The bevel surfaces which are oriented toward each other, independently of the carrier block and bearing nut, are preferably formed as bevel surfaces of rising and falling inclined surfaces of at least two rotary wedges formed as locking elements. Forces can thus be introduced advantageously symmetrically to the injection axis and circumferentially around the plasticiser cylinder, so that a uniform loading is ensured.

The inclined surfaces preferably run around the plasticiser cylinder in a manner spaced from the circumference of the plasticiser cylinder, so that advantageously a symmetrical force introduction is achieved around the plasticiser cylinder. This contributes to a low-wear force introduction.

In a preferred exemplary embodiment, it is also possible that at least one of the rotary wedges has a toothed ring externally. This allows the rotary wedge to be actuated directly on its outer side, whereby a mechanical or motorised drive can be effected reliably and easily, even with high torque.

In a preferred embodiment a toothed rack meshes with the toothed ring of the rotary wedge so that, when the toothed rack moves axially relative to the carrier block, a rotation can be effected at the rotary wedge. This allows a mechanically simple and yet reliable force introduction of a torque for locking and unlocking of the plasticiser cylinder on the carrier block. At the same time, the fundamental structural preconditions for performing an actuation of this kind in a motorised manner are thus also created.

In order to advantageously introduce the forces symmetrically into the plasticiser cylinder and also ensure reliable locking at the carrier block, the bevel surfaces of the locking elements are then arranged on the side spaced from the bearing surface of the bearing nut, and the bevel surfaces of the two locking elements, said bevel surfaces thus bearing against the carrier block, are of equal area. Due to the configuration with equal area, equal forces are transferred on both sides, so that a uniform loading and symmetrical force introduction in respect of the carrier block are provided. Due to the force introduction at the bearing surface of the bearing nut, it is additionally ensured that the forces are transferred gently at the plasticiser cylinder.

In order to actuate the locking elements, adjustment elements are preferably provided, which are mounted on the carrier block and are actuatable in a manner mounted adjustably on the locking elements, or alternatively and additionally are also mounted adjustably relatively to one another between the locking elements. These locking elements can thus be set and adjusted individually in order to thus also ensure a symmetrical force introduction.

A symmetrical force introduction has the advantage, in principle, that the created forces are not only dissipated reliably, but also without any influence on the injection moulding process and thus the quality of the injection moulded parts to be produced.

Further advantages will become apparent from the dependent claims and the following description of preferred exemplary embodiments.

BRIEF DESCRIPTION OF THE FIGURES

The invention will be explained in greater detail hereinafter on the basis of the exemplary embodiments shown in the appended Figures, in which:

FIG. 3 shows a rear view of the carrier block with opened locking device;

FIG. 4 shows a section along line D-D from FIG. 3;

FIG. 5 shows a rear view of the carrier block in accordance with FIG. 3 with closed locking device;

FIG. 6 shows a section along line E-E from FIG. 5;

DETAILED DESCRIPTION OF PREFERRED EXEMPLARY EMBODIMENTS

Figure 1:
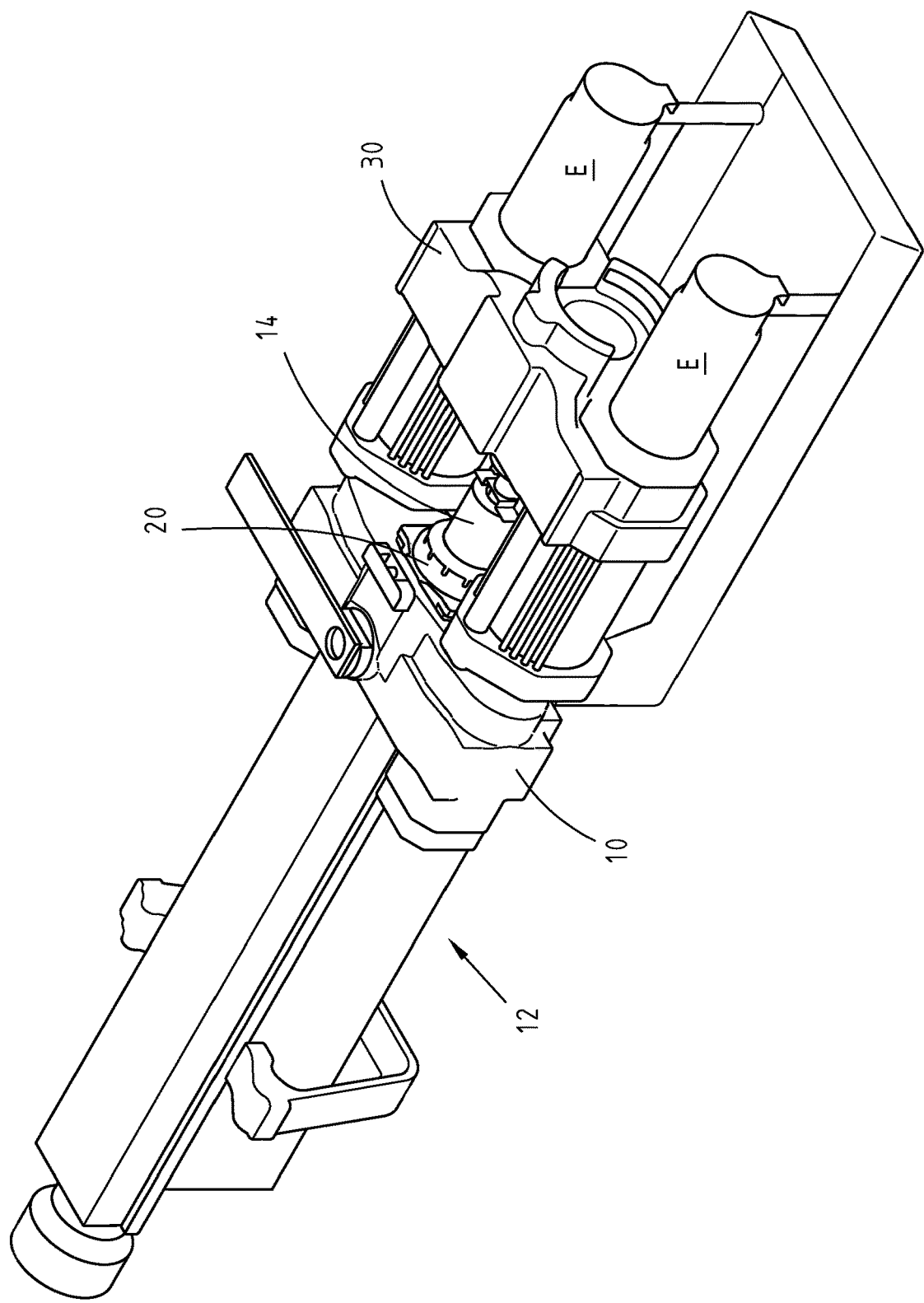
FIG. 1 shows a three-dimensional view of an injection moulding unit.

The invention will now be explained in greater detail by way of example with reference to the appended drawings. The exemplary embodiments, however, are merely examples that are not intended to limit the inventive concept to a specific arrangement. Before the invention is described in detail, it should be noted that it is not limited to the various component parts of the apparatus or the various method steps, since these component parts and method may vary. The terms used here are merely intended to describe particular embodiments and are not used in a limiting sense. If, in addition, the singular or indefinite article are used in the description or in the claims, thus also refers to the plurality of these elements, provided the general context does not clearly state otherwise.

The Figures show four exemplary embodiments of an injection moulding unit for an injection moulding machine for processing plastics and other plasticisable substances, such as powdered, metal, or ceramic substances. In these exemplary embodiments, the same reference signs are used for the same components, unless the different components are being discussed expressly hereinafter.

An injection moulding unit of this kind is part of a (plastics) injection moulding machine which generally comprises a mould closing unit and an injection moulding unit. A cyclically opening and closing injection mould, in the cavity of which the injection moulded part to be produced is manufactured, is received in the mould closing unit. For this purpose, material to be plasticised is homogenised and plasticised in the injection moulding unit, specifically in the plasticiser cylinder 14 of the plasticiser unit 12. A feeding means 16 displaceable along an injection axis a-a and provided usually in the form of a feeding screw or a feeding piston, which injects the plasticised material into the mould cavity on account of an injection movement, is received in the plasticiser cylinder 14. For the injection movement, injection units E (FIG. 1) are mounted in receiving openings 10c of the carrier block 10. The plasticised material is cooled in the injection moulding tool until it solidifies, and once it has cooled is released from the injection mould as an injection moulded part.

Figure 7:
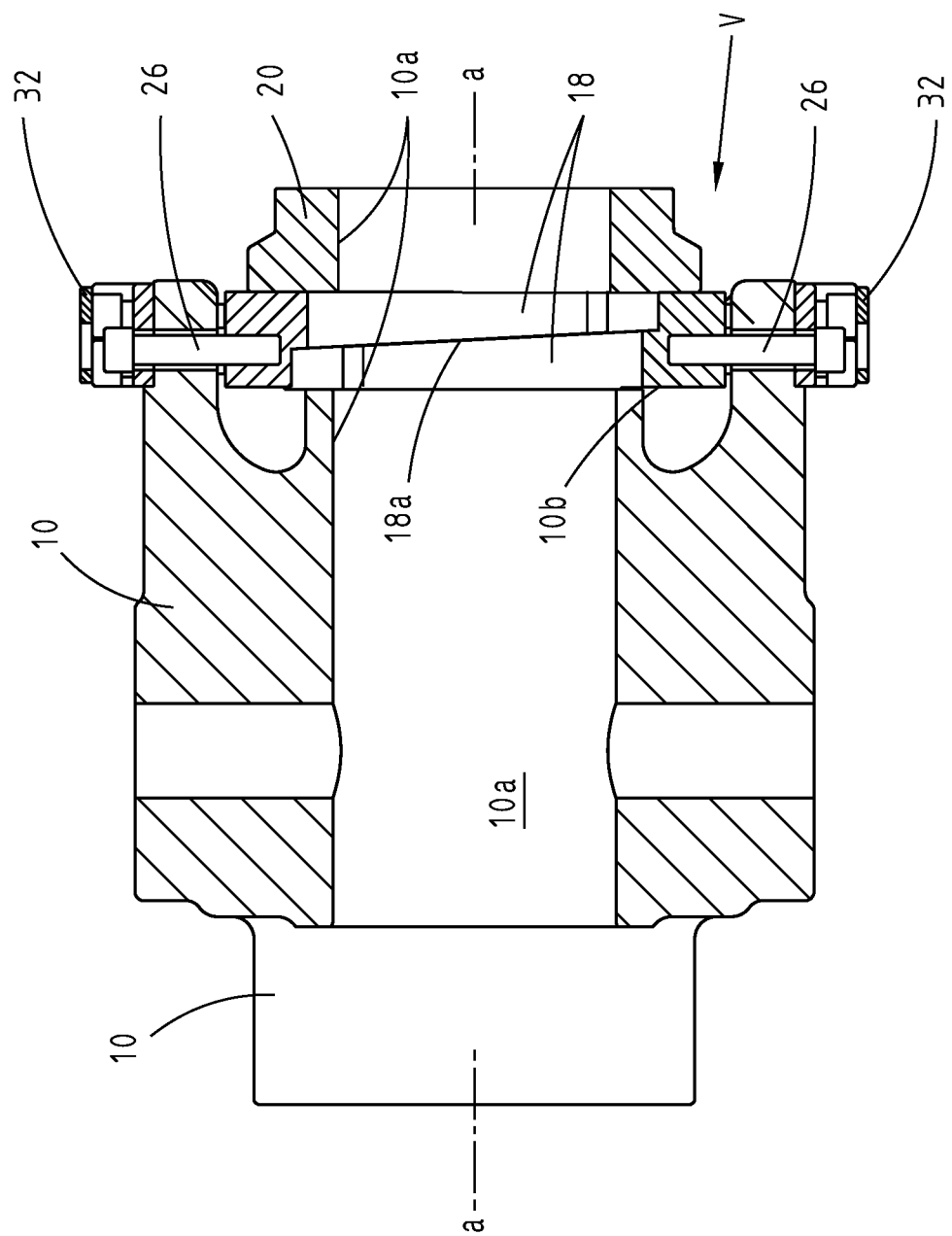
FIG. 7 shows a section through the carrier block without plasticiser cylinder in a position according to FIG. 6.
Figure 8:
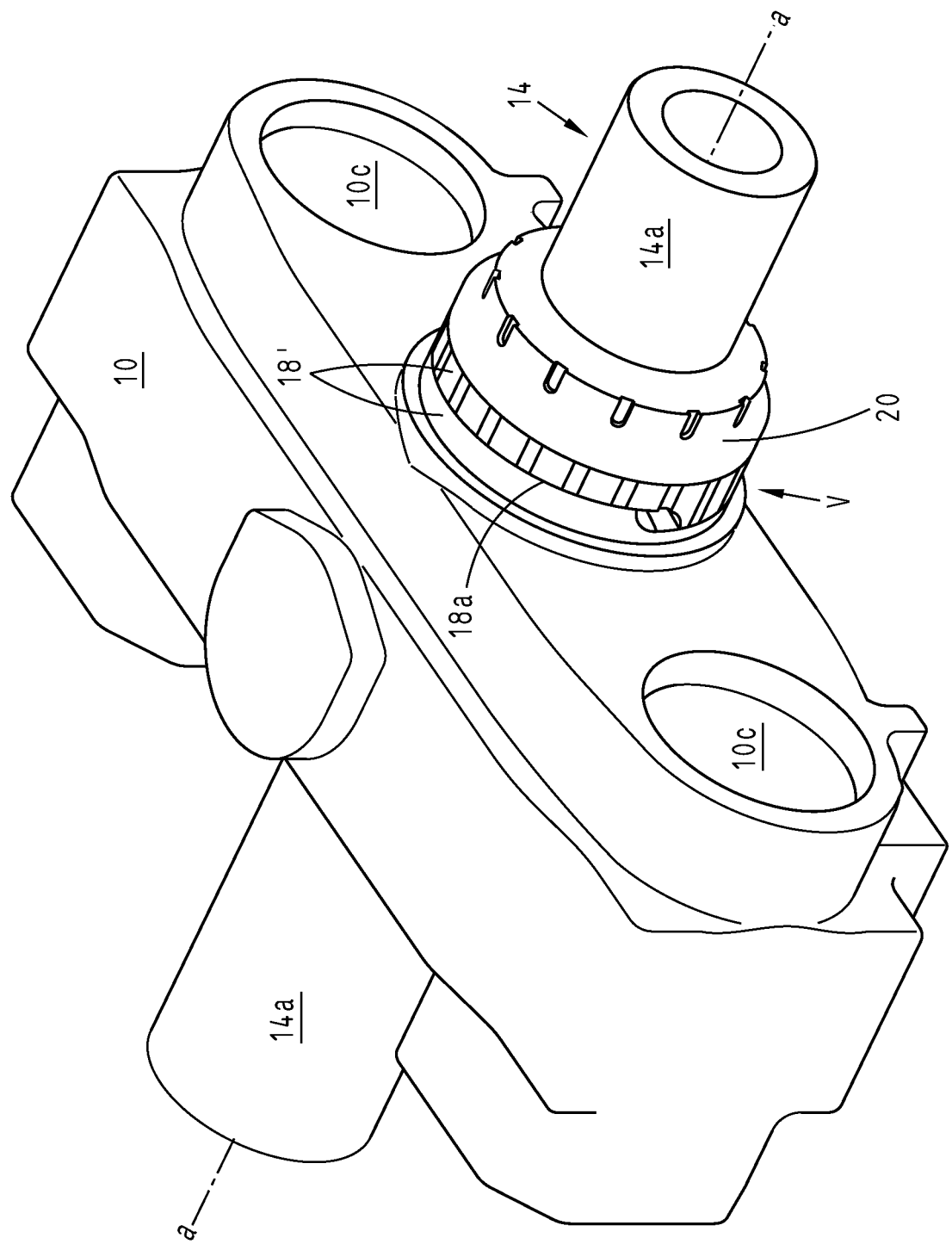
FIG. 8 shows a three-dimensional view of a carrier block with plasticiser cylinder received therein in a second exemplary embodiment.
Figure 10:
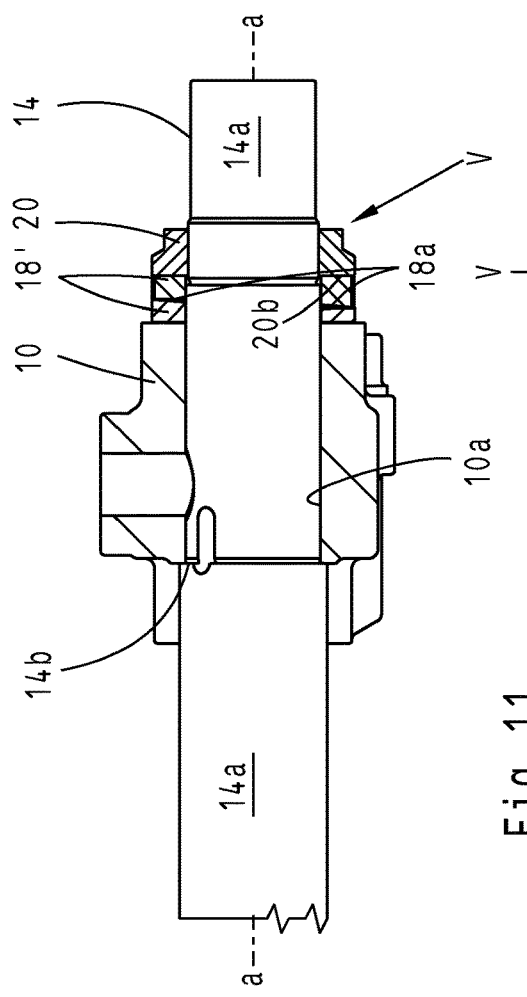
FIG. 10 shows a section along line A-A from FIG. 9.
Figure 11:
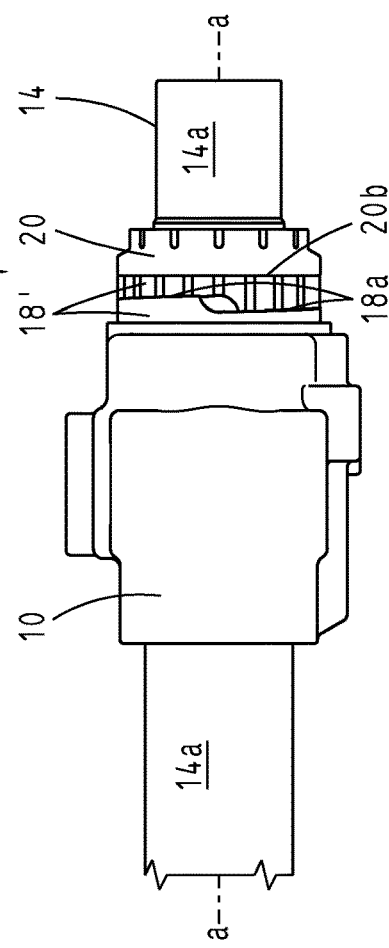
FIG. 11 shows a side view of the injection moulding unit in accordance with FIG. 9.
Figure 9:
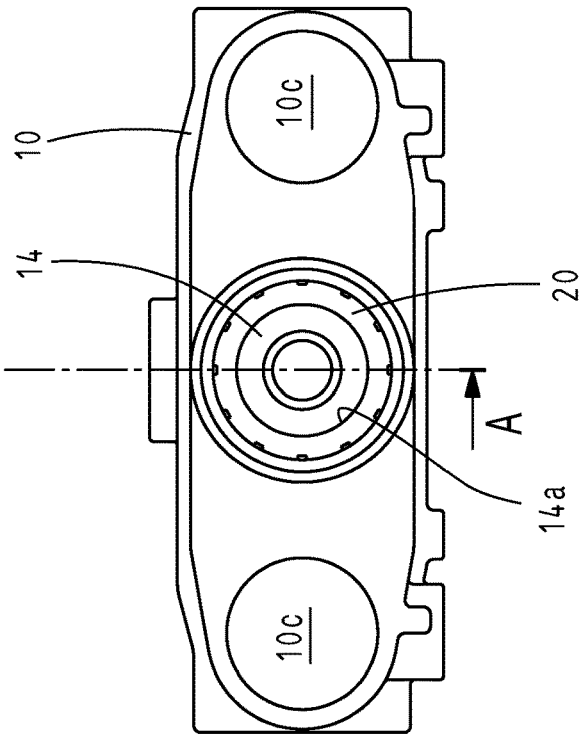
FIG. 9 shows a rear view of the plasticiser unit in accordance with FIG. 8.
Figure 12:
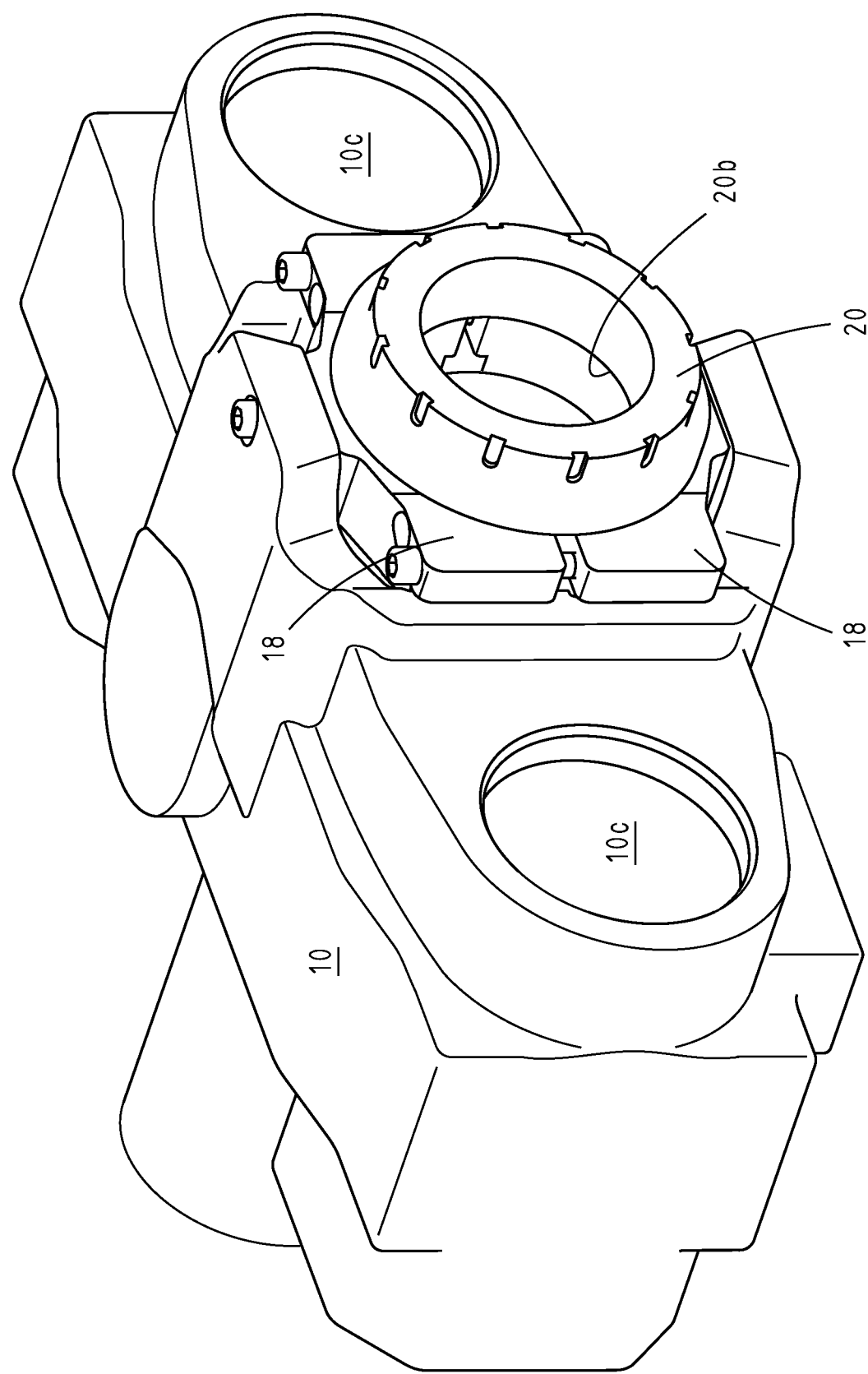
FIG. 12 shows a three-dimensional view of a carrier block without plasticiser cylinder in a third exemplary embodiment.

The injection moulding unit in accordance with FIG. 1 has a carrier block 10 with a central receiving bore 10a visible in FIG. 7. In principle, this receiving bore can also be arranged at another point, i.e. not only centrally. The plasticiser cylinder 14 is arranged so as to be receivable replaceably and releasably in the receiving bore 10a. In order to ensure that the plasticiser cylinder 14 is fixed in the receiving bore 10a in the carrier block 10 during the injection cycle, a locking device V is provided for alternately locking the plasticiser unit 12 to the carrier block 10 and unlocking the plasticiser unit 12 from the carrier block 10. For this purpose, the locking device V has locking elements 18, which effect the locking and unlocking by relative movement of bevel surfaces 18a running transversely to the injection axis a-a.

Figure 2:
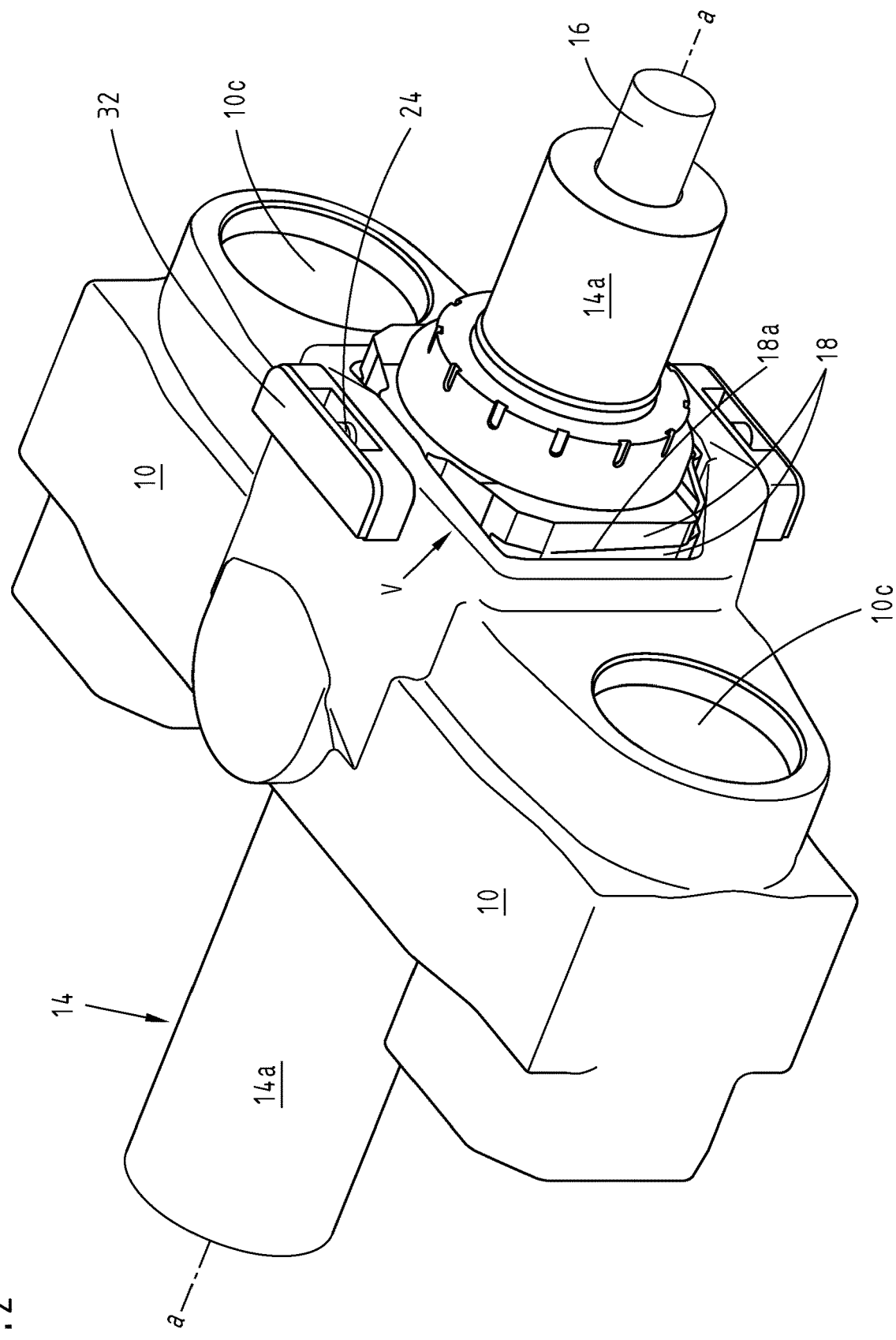
FIG. 2 shows a three-dimensional view of a carrier block with plasticiser cylinder received therein in a first exemplary embodiment.

The locking elements 18 operatively connected to one another are guided on bearing surfaces 10b, 20b of the carrier block 10 and/or bearing nut 20 on the plasticiser cylinder 14. In accordance with FIGS. 2, 4 and 6 the bearing nut 20 on the outer face 14a of the plasticiser cylinder 14 is operatively connected thereto. In accordance with FIGS. 4 and 6 the bearing nut 20, with its surface oriented in the direction of the carrier block 10, forms at least one of the bearing surfaces on which the locking elements are guided. In this case, this is the bearing surface 20b, which is associated with the plasticiser cylinder.

In principle, a plurality of locking elements are provided in all exemplary embodiments and in the first, second and fourth exemplary embodiment have bevel surfaces 18a which are oriented toward each other, independently of the carrier block 10 and plasticiser unit. The locking elements 18 slide on one another, i.e. relative to one another, along these bevel surfaces 18a during the locking and unlocking movements. Alternatively the bevel surfaces 18a in the third exemplary embodiment, on the side of the locking elements 18 spaced from the bearing surface 20b and the bearing nut 20, are provided as oppositely inclined bevel surfaces 18a. These slide during the locking and unlocking movements synchronously on bevel surfaces 10d (FIG. 15) of the carrier block 10.

A feature common to both alternatives is that they allow a symmetrical force introduction of the forces occurring during the injection moulding process for the transfer from the plasticiser cylinder 14 to the carrier block 10, with a low-wear mounting in relation to the attachment to the plasticiser cylinder being achieved at the same time by the bearing nut 20. There is thus no need for stronger engagement in the wall of the plasticiser cylinder 14 in the form of cut-outs or recesses, and instead the bearing nut 20 can be arranged on the outer surface 14a of the plasticiser cylinder 14 and can offer support to the locking elements 18 by way of its bearing surface. This makes it possible to provide a reliable force introduction that can be easily generated, even in large machines, without wear-prone mounting on the plasticiser cylinder.

FIG. 6 shows the locking device V of the first exemplary embodiment in the closed position; it can be seen that the bearing surfaces 10b, 20b on the carrier block 10 and on the bearing nut 20 respectively are not at an incline to the injection axis a-s, but are arranged at a right angle to the injection axis a-a. Thus, only forces that act normal to the bearing surface occur at these bearing surfaces, so that no transverse forces in the surface are created at these points either, which might lead to friction and thus to wear. The surfaces at risk of wear are thus shifted to the bevel surfaces 18a of the locking elements 18 and thus to elements that can be easily replaced in comparison to the plasticiser cylinder 14 or carrier block 10.

In the first exemplary embodiment of FIGS. 1 to 7, the locking elements 18 are formed by at least two wedges guided diametrically to the injection axis a-a between the carrier block 10 and bearing nut 20 and guided on the bearing surfaces 10b and 20b respectively. The locking device V in accordance with FIG. 3 comprises a bearing element 32, on which there are mounted various adjustment elements 24, 26. In accordance with FIG. 3, adjustment elements 24 are provided centrally, which are arranged in the bearing element 32 such that, when actuated, the locking elements 18 are transferred into the locking position. The adjustment elements 24 mounted in the bearing element 32 move here in the form of screws such that their ends contact the wedges. In order to transfer these wedges from the locked position back into the unlocked position, further adjustment elements 26 are provided in accordance with FIG. 6 and are mounted at one end on the bearing element 32, but at the other end are engaged with the locking elements 18. The locking elements 18 can be transferred by means of these adjustment elements 26 from the locked position into the unlocked position.

In principle, the plasticiser cylinder 14 is locked to the carrier block 10 as follows: In the starting state, the carrier block 10 has the receiving bore 10a. The plasticiser 14 is introduced into this receiving bore, in FIG. 4 from the left, until it comes to rest with a shoulder 14b on the left side against the edge of the receiving bore 10a. At this moment in time, the other end of the plasticiser cylinder 14 already protrudes from the carrier block 10 on the opposite side. The locking elements 18 are at this moment located in an open position, as can be seen in FIG. 4, The bearing nut 20 is now mounted on the outer face 14a of the plasticiser cylinder 14. It forms a bearing surface 20b for the locking elements 18 with its surface oriented toward the locking elements 18. In accordance with FIGS. 3 and 4 the adjustment elements 24 are now actuated and thus move the locking elements 18 relative to one another. Here, the upper locking element 18 in FIG. 4 is actuated in exactly the same way as the lower locking element 18. In accordance with FIG. 4 the locking elements are guided here on the bearing surface 10b of the carrier block 10 in exactly the same way as on the bearing surface 20b of the bearing nut. At the same time, the bevel surfaces 18a slide on one another, so that an axial movement of the plasticiser cylinder to the right in FIG. 4, i.e. a clamping movement, is produced.

The bearing nut 20 is tightened at the start of the locking process by means of an external thread until it "blocks" against the locking elements 18 formed as wedges. The wedges are then displaced vertically by means of the adjustment elements 24, The vertical displacement leads to a horizontal clamping force between the carrier block 10 and bearing nut 20. If the system is under "load" by means of the locking elements, it is no longer possible to turn the bearing nut 20. Operation of the plasticiser unit 12 is possible in this locked position.

If the locking is to be released again, the adjustment elements 24 are first released, so that the adjustment elements 24 no longer bear against the locking elements 18. In the next step the adjustment elements 26 are then actuated, in order to transfer the locking elements 18 actively from their clamped position into an unlocked position in accordance with FIG. 7. If the locking elements 18 are in the unlocked position, the plasticiser cylinder 14 can be removed from the carrier block 10 once the bearing nut 20 has been opened, thus resulting in the state illustrated in accordance with FIG. 7.

FIGS. 8 to 11 show a second exemplary embodiment in which the locking elements are formed by rotary wedges 18'. These rotary wedges 18' also have bevel surfaces 18a which are oriented toward one another in accordance with FIG. 11, independently of the carrier block 10 and bearing nut 20 and thus also independently of the plasticiser cylinder 14, but are formed as circumferential inclined surfaces.

The further structure is, in principle, the same as in the first exemplary embodiment, in particular with regard to the fixing of the plasticiser cylinder 14 in the receiving bore 10a of the carrier block 10. Here too, the shoulder 14b in accordance with FIG. 10 comes to abut on the left side of the receiving bore 10a. If the bearing nut 20 is fixed, bearing surfaces 10b of the carrier block 10 and 20b of the bearing nut 20 are formed and likewise lie at a right angle to the injection axis a-a. The rotary wedges 18' can be rotated relative to one another between these bearing surfaces, with a corresponding wedging resulting if the bearing nut 20 is fixed, the plasticiser cylinder 14 being pulled to the right in FIG. 8. The bearing nut 20 serves as a counter-bearing for the axial force applied by the rotary wedges 18'. It is not possible to adjust the bearing nut 20 following application of the clamping force.

The inclined surfaces of the rotary wedges 18' are spaced from the circumference of the plasticiser cylinder 14 and run around the plasticiser cylinder. Here too, a symmetrical force introduction into the plasticiser cylinder 14 is thus ensured by means of the bearing nut 20, which is mounted on the outer face 14a of the plasticiser cylinder 14 and which additionally acts in a force-transferring manner over a sufficiently large area over the entire circumference of the plasticiser cylinder.

FIGS. 12 to 15 show a third exemplary embodiment in which the locking elements 18, on the side spaced from the bearing surface 20b of the bearing nut 20, have oppositely inclined bevel surfaces 18a, which slide synchronously on bevel surfaces 10d (FIG. 15) of the bearing block 10 during the locking and unlocking movements.

Figure 13:
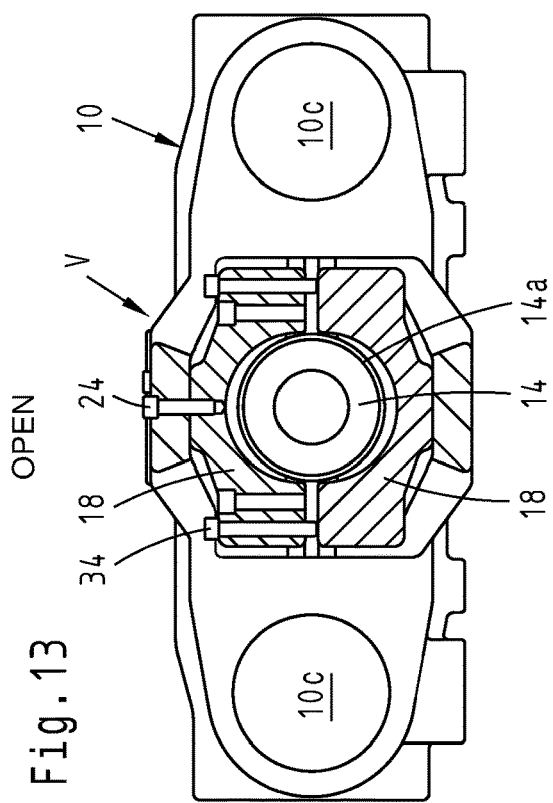
FIGS. 13, 14 show a rear view, partly in section along line F-F from FIG. 15, of the carrier block in accordance with FIG. 12 with open and closed locking device respectively.
Figure 14:
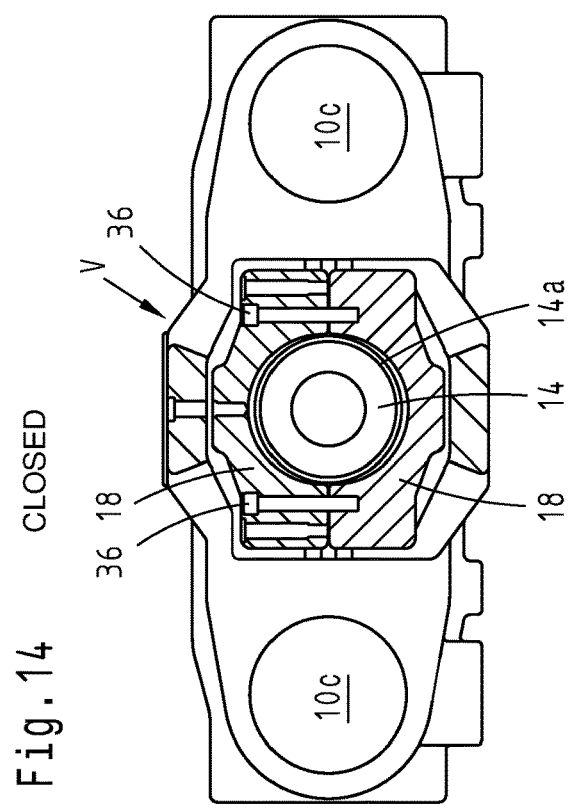

In accordance with FIG. 13, in this case too, adjustment elements 24 are mounted on the carrier block 10 in order to ensure a fixing of the locking device V with its locking elements 18. A further adjustment element 34 is located off-centre and is shown in the open position of the locking device in accordance with FIG. 13. A spacing can clearly be seen in the middle between the locking elements 18. The locking elements 18 are located here in a position arranged symmetrically to the injection axis a-a. The locking elements 18 are guided on a bearing surface 20b (FIG. 15) of the bearing nut 20. On the opposite side, the bevel surfaces 18a are provided and are arranged in an oppositely directed manner and at an incline to the injection axis a-a.

In accordance with FIG. 13 the locking is still open, with an adjustment element 34 arranged off-centre still holding the locking elements 18 at a spacing. In order to effect the locking, so that the locking device V with its locking elements 18 actually locks the plasticiser cylinder 14 to the carrier block 10, the adjustment element 34 is actuated such that the locking elements 18 in accordance with FIG. 14 can move toward one another. For this purpose, in accordance with FIG. 14, further adjustment elements 36 are actuated, which are arranged closer to the injection axis a-a passing centrally through the plasticiser cylinder and clamp the locking elements 18 to one another. The process is performed in reverse in order to release the locking.

Figure 15:
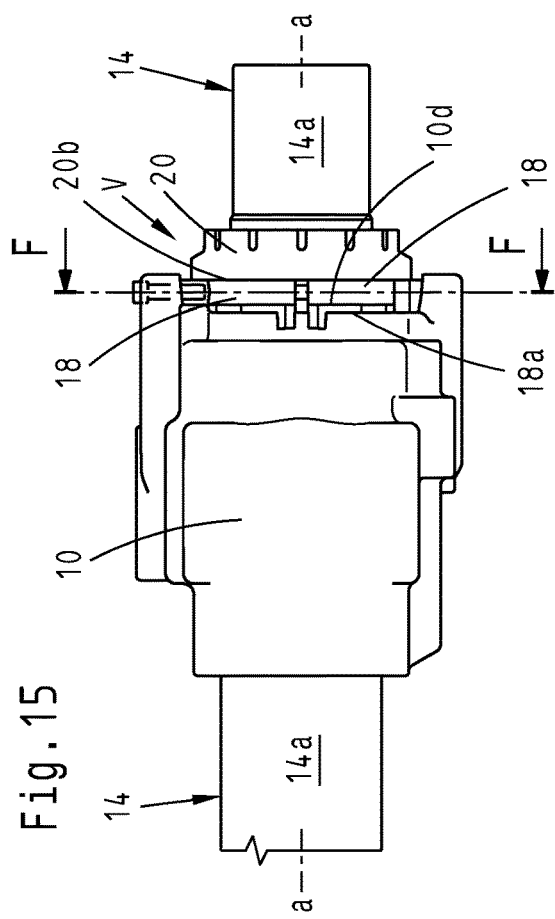
FIG. 15 shows a side view of the carrier block in accordance with FIG. 12.

It can be seen in FIG. 15 that the bevel surfaces 18a of the locking elements 18 bearing against the bevel surfaces 10d of the carrier block 10 and arranged above and below the injection axis a-a are of approximately the same size, i.e. they are equal in area, thus resulting in uniform pressing, which contributes to an axial clamping movement of the plasticiser cylinder 14 on the carrier block 10. Due to the oppositely directed bevel surfaces 18a of the locking elements 18, each locking element generates a horizontal clamping force in the direction of the injection axis a-a and an area force transverse to the injection axis. Due to the different wedge geometries, the area forces are directed oppositely and thus cancel one another out, which has a wear-minimising effect.

Both the arrangement relative to the injection axis a-a and the configuration with equal areas contribute to a symmetrical force introduction and, in particular, to the fact that no negative influence is produced in particular at the carrier block 10 in the region of the feed opening for the material to be plasticised. This contributes both to careful treatment of the plasticiser cylinder 14 and also to a uniform loading of the connection parts, which, besides the arrangement of the locking elements 18, further reduces the wear of the parts operatively connected to one another.

Figure 16:
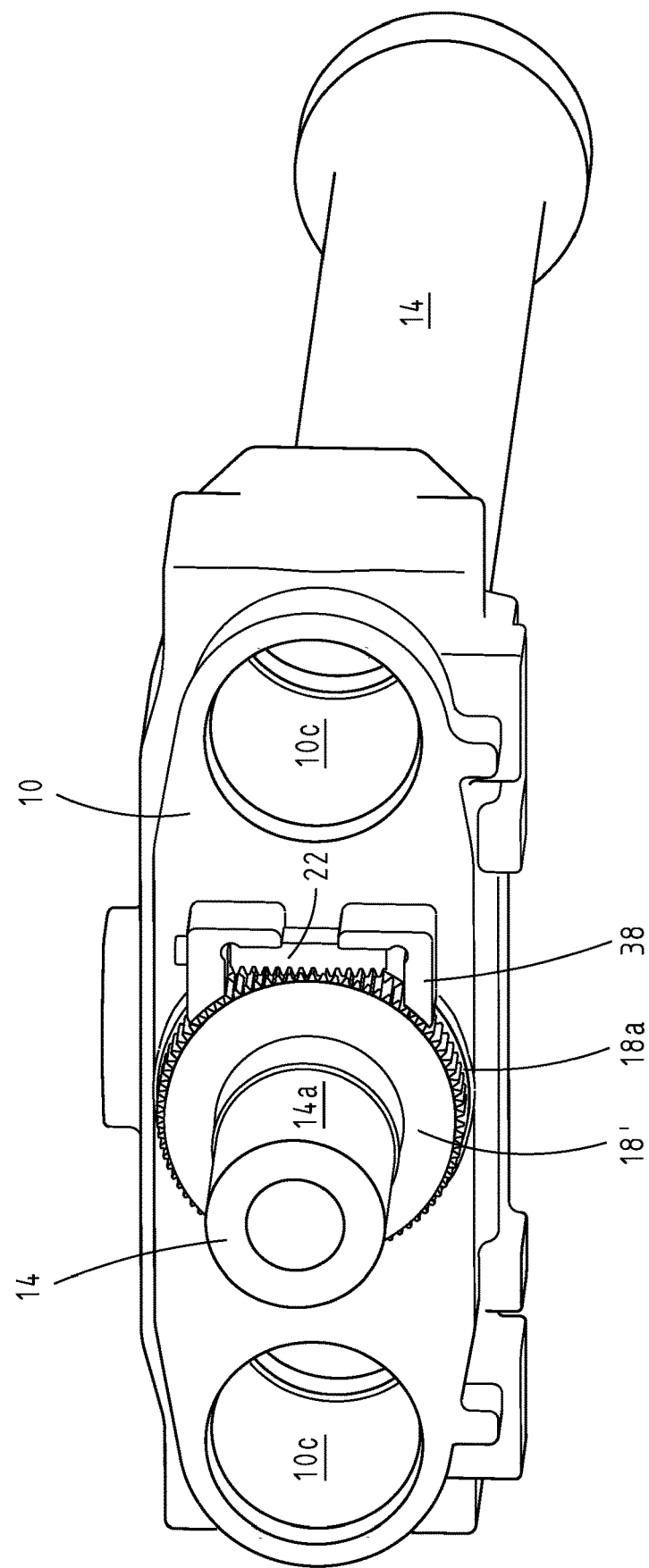
FIG. 16 shows a three-dimensional view of a carrier block with plasticiser cylinder received therein in a fourth exemplary embodiment.
Figure 17:
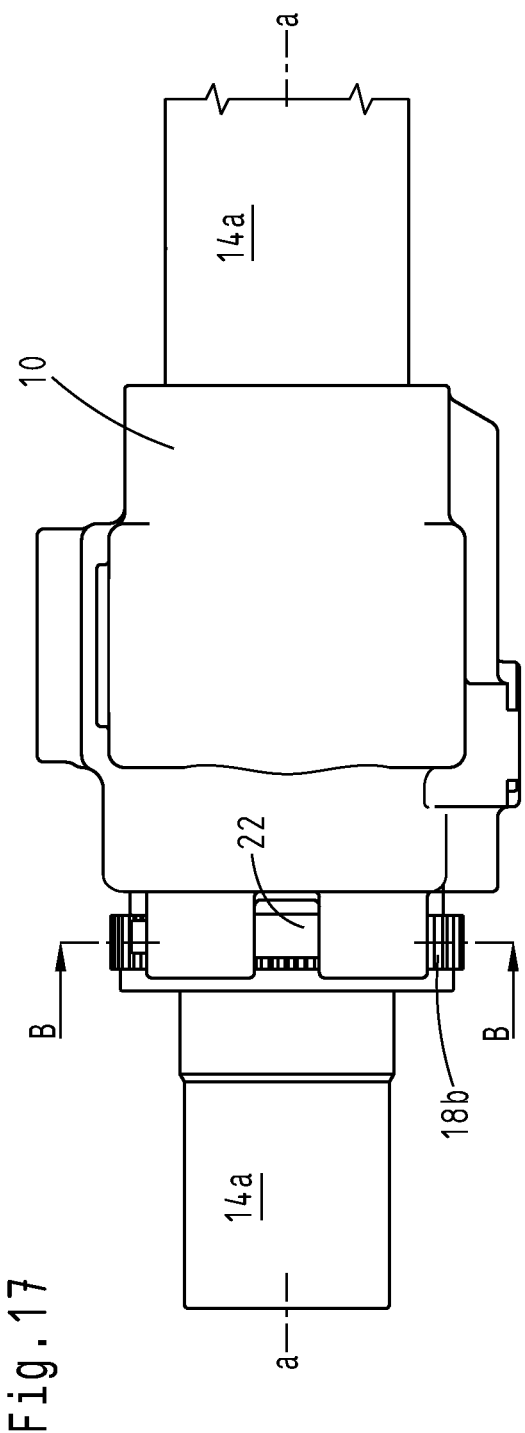
FIG. 17 shows a side view of the carrier block in accordance with FIG. 16.
Figure 18:
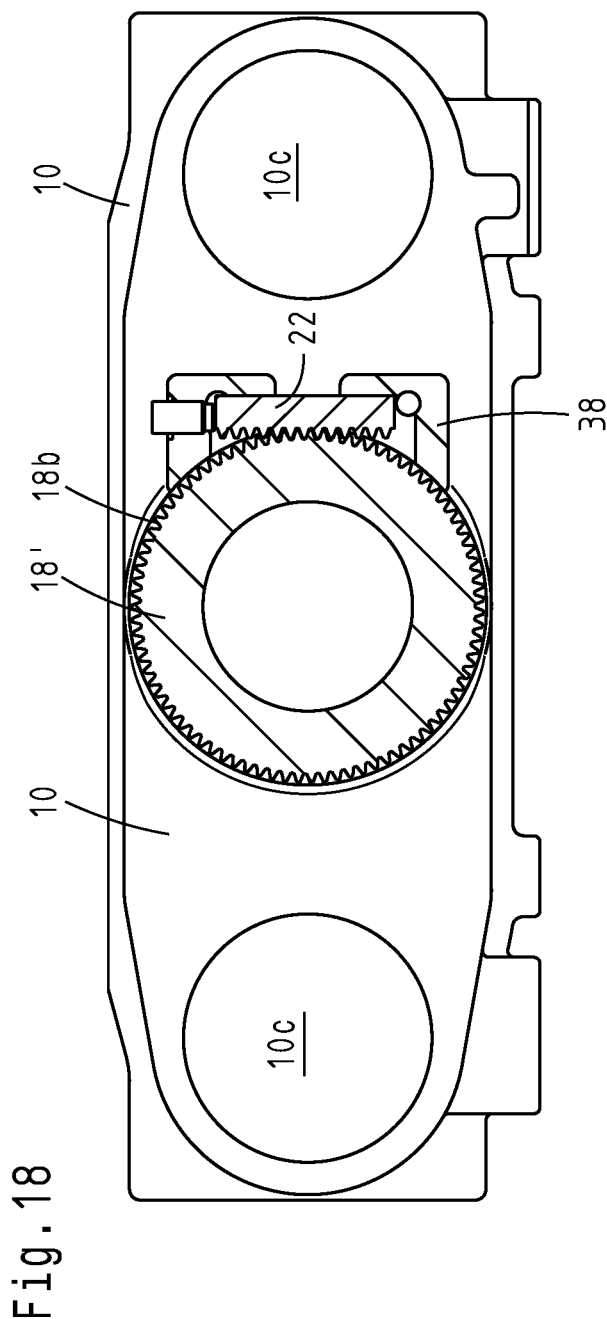
FIG. 18 shows a section along line B-B from FIG. 17.

In a fourth exemplary embodiment, FIGS. 16 to 18 show a possibility for actuating in particular the rotating nuts, such as the rotary wedges 18', or also the bearing nut 20. In the specific exemplary embodiment, a rotary wedge 18' is shown, which has a toothed ring 18b externally. A toothed ring of this kind can be arranged on at least one of the rotary wedges 18' or on the bearing nut 20. A toothed rack 22 meshes with the toothed ring 18b of the rotary wedge 18' and is mounted in a mount 38 so as to be axially movable. Alternatively, it could also be mounted rotatably about its vertical axis, similarly to a spindle drive. The toothed rack can be displaced axially by means of an actuation element. By way of its engagement in the toothed ring 18b, a rotary movement of the rotary wedge 18' can be effected, in order to effect the locking or unlocking, for example in accordance with the second exemplary embodiment.

A feature common to the exemplary embodiments is that a symmetrical force introduction into the carrier block 10 of the forces created during the injection moulding process, in particular during the injection, is ensured. In addition, due to the selected arrangement of the locking elements 18, 18', a low-wear implementation and arrangement of the parts interacting with one another can be achieved.

Besides the manual actuation of the locking elements, a hydraulic, electric, pneumatic, or otherwise assisted movement of the locking elements and of the locking device is also possible.

It goes without saying that this description may be subject to the most diverse modifications, changes and adaptations which are within the range of equivalents to the attached claims.

The invention claimed is:

1. An injection moulding unit for an injection moulding machine for processing plastics and other plasticisable substances, comprising a carrier block with a receiving bore, a replaceable plasticiser cylinder of a plasticiser unit, the plasticiser cylinder being removably receivable in the receiving bore, in which plasticiser cylinder there is arranged a feeding means which is movable along an injection axis, a locking device for alternately locking the plasticiser unit on the carrier block and unlocking the plasticiser unit from the carrier block by relative movement of bevel surfaces running transversely to the injection axis on operatively connected locking elements which are guided on bearing surfaces of at least one of the carrier block (10) and the plasticiser cylinder, wherein a bearing nut is provided on an outer surface of the plasticiser cylinder, the outer surface of said bearing nut oriented in the direction of the carrier block forming at least one of the bearing surfaces, and wherein a plurality of locking elements are provided which have, on the side spaced from the bearing surface of the bearing nut, oppositely inclined bevel surfaces which slide synchronously on bevel surfaces of the carrier block during a locking movement and during an unlocking movement and are guided diametrically to the injection axis towards each other.

2. An injection moulding unit in accordance with claim 1, wherein the bearing surfaces of the at least one of the carrier block and the bearing nut are arranged at a right angle to the injection axis (a-a).

3. An injection moulding unit in accordance with in accordance with claim 1, wherein the locking elements are formed by at least two wedges between the carrier block and the bearing nut (20).

4. An injection moulding unit in accordance with claim 1, wherein, in the case of oppositely inclined bevel surfaces of the locking elements on the side spaced from the bearing surface of the bearing nut, the bevel surfaces of the two locking elements bearing against the carrier block are of equal area.

5. An injection moulding unit in accordance with claim 1, wherein the locking elements are configured to be actuated by means of adjustment elements mounted on the carrier block and mounted adjustably on the locking elements.

* * * * *